E. G. SPILSBURY.
SEPARATING OF SOLIDS AND LIQUIDS.
APPLICATION FILED NOV. 30, 1909.

994,281.

Patented June 6, 1911.

UNITED STATES PATENT OFFICE.

EDMUND GYBBON SPILSBURY, OF NEW ROCHELLE, NEW YORK, ASSIGNOR TO JUST PROCESS COMPANY, OF SYRACUSE, NEW YORK, A CORPORATION OF NEW YORK.

SEPARATING OF SOLIDS AND LIQUIDS.

994,281.  Specification of Letters Patent.  Patented June 6, 1911.

Application filed November 30, 1909. Serial No. 530,547.

*To all whom it may concern:*

Be it known that I, EDMUND GYBBON SPILSBURY, a resident of the city of New Rochelle, in the county of Westchester and State of New York, have invented certain new and useful Improvements Relating to the Separating of Solids and Liquids, of which the following is a specification, reference being had to the accompanying drawings, forming a part hereof.

The improvements are particularly applicable to the treatment of ore which is to undergo the cyanid process of the metal extraction and for that reason will be explained more particularly with such application in view, although the invention may be embodied in filters for use in various other connections.

As the cyanid process is generally carried on today, the crushed ore, after being subjected to cyanidation, is filtered in large immovable tanks provided with filters of different sorts through which the solution is either driven or drawn, the insoluble portions thereof being left upon the filter surface as an incrusted cake or thick coating which is usually made to undergo a washing or other treatment to recover its contained values. In carrying out the present invention an apparatus may be utilized in which the treatment of the ore may be effected in the first instance as well as the subsequent filtering and which apparatus should be particularly adapted for the convenient treatment and discharge of the residual cake.

Figure 1:
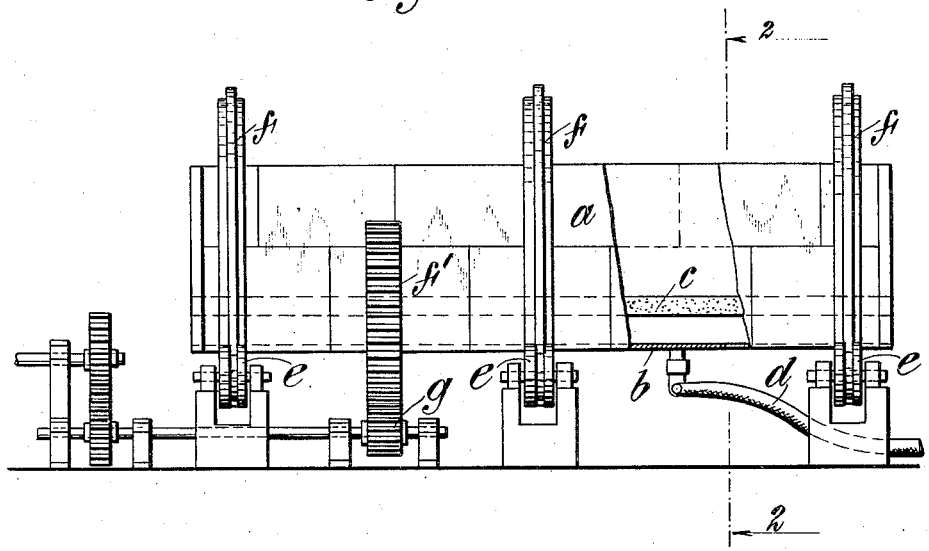
Figure 2:
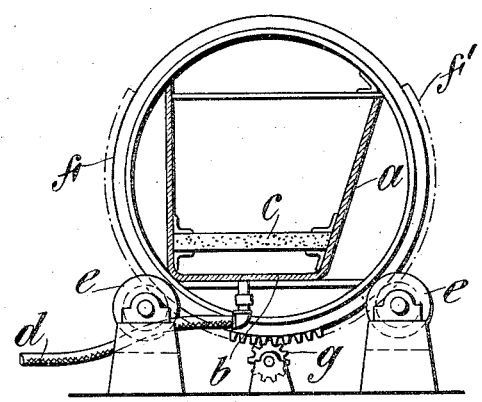

The improvements may best be described with reference to a practical embodiment thereof, and one such embodiment is shown in the accompanying drawings in which, Figure 1 represents the same in side elevation, one side of the tank being broken away to show the filtering septum, and Fig. 2 is a view thereof in transverse section the plane of which is indicated by the line 2—2 in Fig. 1.

It should be mentioned that the drawings are not intended to illustrate an apparatus complete in all its accessories for carrying on or practicing any particular process in the arts but is simply designed to illustrate the application of the present invention to a filtering tank which may be used as a cyanid tank or for some other purpose with such appropriate adaptation as the particular use may dictate. As such, the apparatus in the present case comprises a tank $a$ having a bottom $b$ and, provided therein across the bottom $b$, a rigid porous septum $c$, preferably of a mineral composition, which constitutes the filtering element.

When the apparatus is used in practicing the cyanid process, the crushed ore may be introduced into the tank and there treated in accordance with the details of this process and then the cyanided solution may be drawn off through the septum $c$ by means of a piping $d$ which is adapted to be connected to a suitable exhaust apparatus in order to produce a suction to draw the liquid through the septum. When the solution has been thus withdrawn, the solid or insoluble matter therein will be left incrusted upon the top of the septum $c$; and, in the case of the cyanid process, it will be preferable to wash this residue in order to obtain the retained values. For this purpose, the pipe $d$ may be connected to a water main so as to drive water up through the septum $c$, thus breaking up the cake and stirring it up in the water as it flows in, or by introducing water into the top of the tank and compressed air through the pipe $d$ in order to blow the cake from the septum and distribute it throughout the added water. Whichever method is followed is immaterial to the present invention. Thereafter, the pipe $d$ is connected so that the liquid may again be drawn off and leave the solid matter once more incrusted upon the top of the septum.

It will now be assumed that the cake of solid matter has been sufficiently treated, so far as the present apparatus is concerned, and is to be removed therefrom. I have discovered that if the tank be tilted or inverted sufficiently to permit the cake to drop out by gravity, there will be enough moisture retained in the septum $c$ to act upon the under face of the cake next to the septum, thereby softening the same and preventing it from adhering or incrusting itself upon the septum; so that by giving the tank a blow or by loosening or starting the cake in some other way, it will drop out as a whole from the tank and may be received and removed in some suitable receptacle placed underneath. This is not only much easier and simpler than shoveling out the cake from an immovable tank but it prevents the cake from sticking hard to the septum. Accordingly, the tank is mounted upon rollers *e*, each end and the middle of the tank being provided, as shown, with an annulus *f* which has a peripheral flange to engage in the peripheries of the corresponding rollers. Moreover, the tank is also provided with a gear-annulus *f'* (shown as a sector in the present case) and adapted to be engaged by a pinion *g* which is connected to a suitable mechanism for rotating or tilting the tank to a sufficient angle to bring it into the desired position for discharging. The front end of the tank *a* is made preferably flaring to assist in the discharging and the tube *d* is made flexible to allow for the motion of the tank. Instead of imparting a blow to the tank it will ordinarily be preferable to loosen the cake by applying compressed air through the pipe *d*.

It will be obvious that the invention may be carried out in various other forms of apparatuses than that specifically described and that various changes may be made without departing from the spirit and scope of my invention.

I claim as my invention:

1. The method of separating solids from liquids consisting in withdrawing the liquid down through a porous rigid septum which will retain moisture therein then tilting the septum and while the moisture is still retained therein forcing gaseous fluid backward through the septum against the residue thereupon to remove the latter.

2. In the method of separating solids from liquids the withdrawing of the liquid down through a porous rigid septum which will retain liquid in the pores thereof and leaving the residue thereupon then tilting the septum and when in tilted position and while liquid is contained in the pores forcing air back through the septum and allowing the residue to slide therefrom.

3. The method which consists in filtering off the liquid from a mixture of solids and liquids by passing the liquid down through a porous rigid mineral septum which will retain liquid therein and depositing the solid matter thereupon as a residue and then while liquid is contained in the pores of the septum forcing a gaseous fluid backward through the septum thereby facilitating the sliding and removing of the residue from the septum.

This specification signed and witnessed this 29th day of November, A. D., 1909.

E. GYBBON SPILSBURY.

Signed in the presence of—
    LUCIUS E. VARNEY,
    G. McGRANN.